No. 852,020. PATENTED APR. 30, 1907.
M. GOODFELLOW.
STEERING TRUCK FOR AGRICULTURAL IMPLEMENTS.
APPLICATION FILED JAN. 28, 1904.
3 SHEETS—SHEET 2.
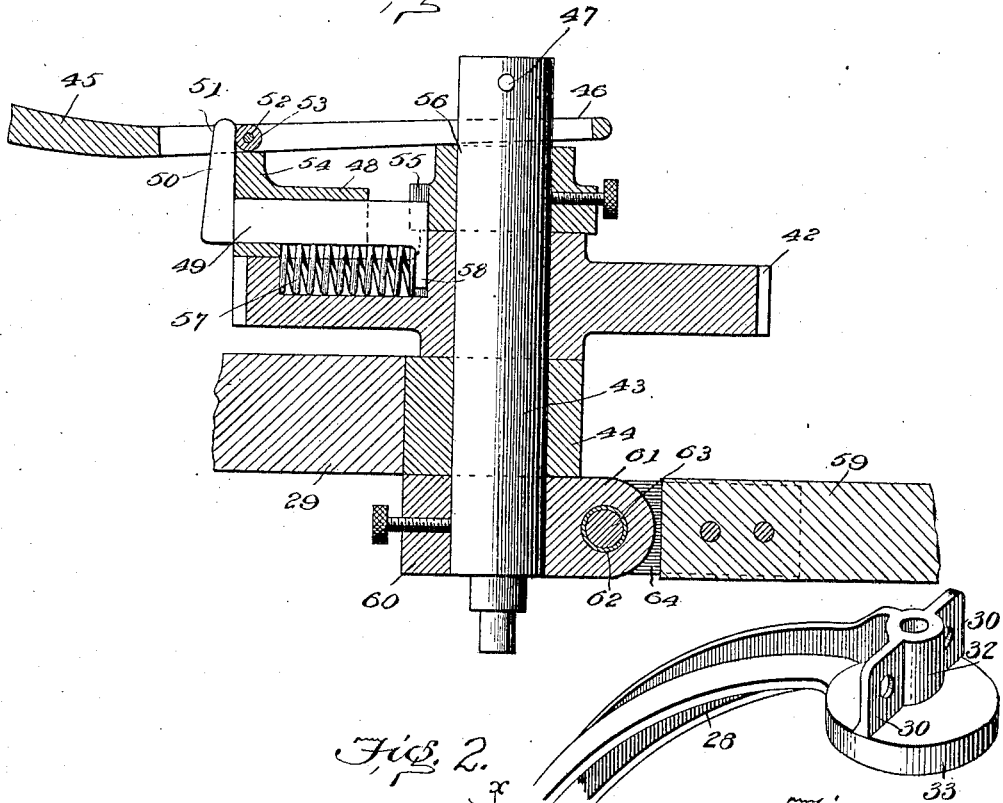
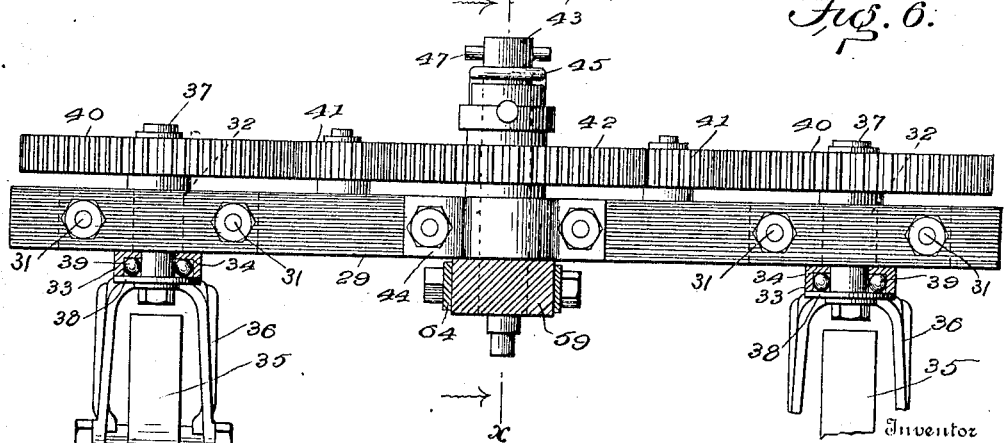
Witnesses
Inventor
Moore Goodfellow,
Attorney.

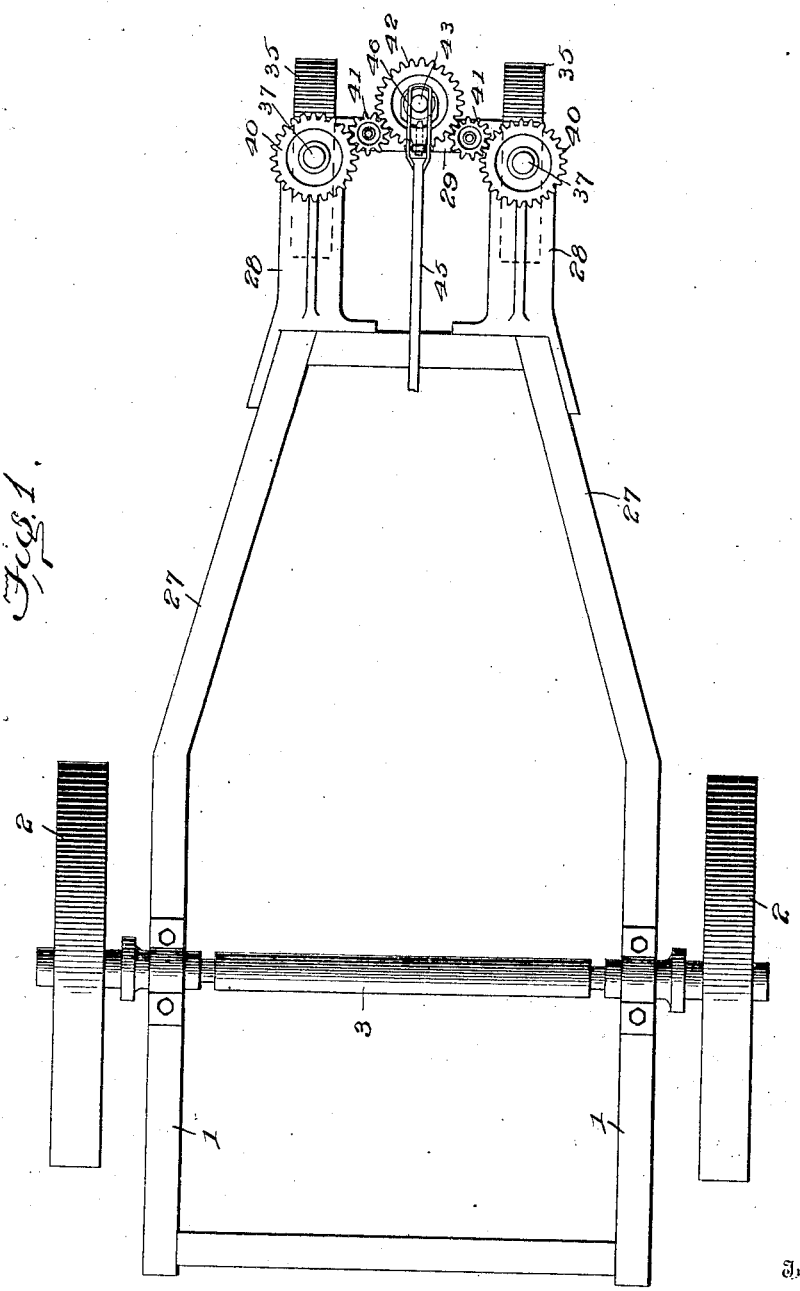

No. 852,020. PATENTED APR. 30, 1907.
M. GOODFELLOW.
STEERING TRUCK FOR AGRICULTURAL IMPLEMENTS.
APPLICATION FILED JAN. 28, 1904.
3 SHEETS—SHEET 3.
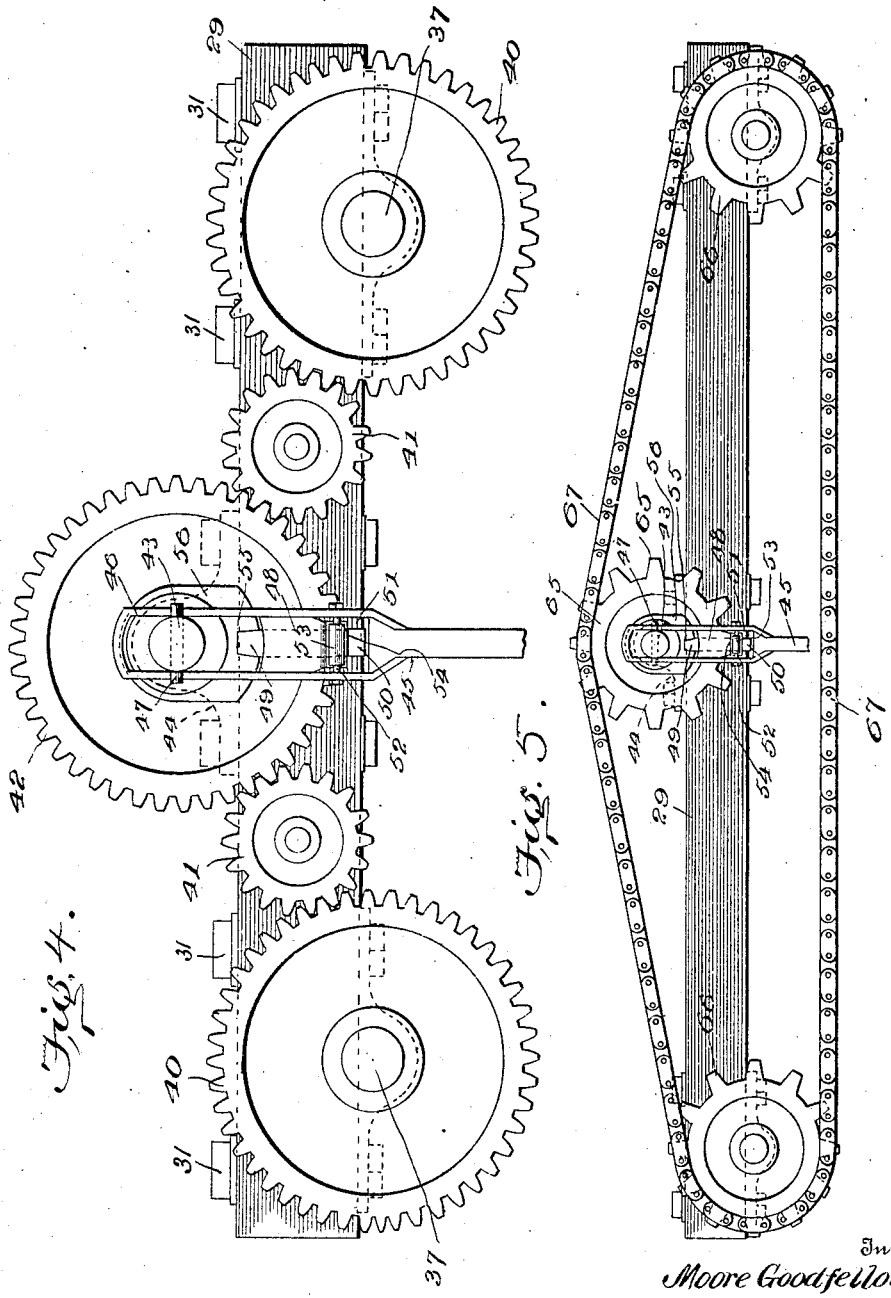
Witnesses
G. Howard Walmsley.
Irvine Miller
Inventor
Moore Goodfellow,
By 
Attorney,

# UNITED STATES PATENT OFFICE.

MOORE GOODFELLOW, OF CLEVELAND, OHIO, ASSIGNOR OF ONE-HALF TO JOSEPH O. DYE, OF SPRINGFIELD, OHIO.

STEERING-TRUCK FOR AGRICULTURAL IMPLEMENTS.

No. 852,020. Specification of Letters Patent. Patented April 30, 1907.

Application filed January 28, 1904. Serial No. 191,011.

*To all whom it may concern:*

Be it known that I, MOORE GOODFELLOW, a citizen of the United States, residing at Cleveland, in the county of Cuyahoga and State of Ohio, have invented certain new and useful Improvements in Steering-Trucks for Agricultural Implements, of which the following is a specification, reference being had therein to the accompanying drawings.

This invention relates to steering trucks for agricultural implements, and has for its primary object to provide a structure whereby the steering or control of the direction of travel of the implement may be, at will, effected either through the changing of the direction of the travel of the draft-animals or other means employed for drawing the machine, or directly by mechanism manually controlled by the operator without affecting the line of travel of the means employed in drawing the machine.

To these and other ends, my invention consists in certain novel features which I will now proceed to describe, and will then particularly point out in the claims.

In the accompanying drawings. Figure 1 is a plan view of a structure embodying my invention; Fig. 2 is a detail front elevation of the same, on an enlarged scale; Fig. 3 is a detail sectional view, on an enlarged scale, taken on the line *x x* of Fig. 2, and looking in the direction of the arrows; Fig. 4 is an enlarged plan view of the front portion of the machine; Fig. 5 is a similar view illustrating a modification; Fig. 6 is a detail view of a spindle bearing.

In the drawings, I have shown a structure embodying my invention in its preferred form, in which 27 indicates the frame of the implement, supported, by means of ground wheels 2, and an axle 3 at the rear. From the front of this frame arms 28 extend forward and upward to a cross-bar 29, which forms the body of the front truck, which is rigidly connected with the frame of the implement by means of the arms 28. Each arm 28 is preferably provided at its forward end with vertical flanges 30, by means of which the cross-bar 29 is bolted to said arms by bolts 31. The bearings for the forward truck wheel spindles are also preferably formed in the forward ends of these arms 28, being shown in the present instance in the form of vertical sleeves 32, one at the end of each arm 28, the rear face of the cross-bar 29 being preferably recessed to receive the sleeves 32, which project somewhat beyond the front faces of the flanges 30. Each sleeve 32 terminates in a recessed bearing cup 33 at its lower end, the upper face of which extends under and supports the cross-bar 29, while its under face is provided with a raceway 34 for the bearing balls hereinafter referred to.

The front truck wheels are indicated by the reference numeral 35, and each wheel is mounted in a fork 36, having a spindle 37 extending vertically upward in the center of the plane of the wheel, radially with respect to the wheel. This spindle fits within and projects above the sleeve 32, and at its base there is formed, on top of the yoke 36, an annular bearing track 38, on which travel bearing balls 39, located in the raceway 34 of the bearing cup 33.

It will be seen that if the steering spindles of the front wheels are simultaneously rotated in the same direction, the implement may be readily guided in any desired direction, and it will furthermore be seen that since the axis of rotation of the wheel is a central vertical one, the rotary movement may be effected with a minimum amount of power. To effect this rotation of the guiding wheels, I connect them both to a central controlling mechanism by means of suitable intermediate transmitting mechanism.

Where the forward truck is of comparatively small width I prefer to employ the mechanism shown in Figs. 1, 2, 3 and 4, in which each steering spindle 37 has secured on it, preferably on its projecting end, a gear 40. The cross-bar 29 has mounted on it idle pinions 41, which mesh with the gears 40 and also with a central controlling gear 42. The gear 42 is loosely mounted on a vertical shaft 43, mounted in a bearing 44, secured to the front of the cross-bar 29. This gear may be rotated independently of the shaft 43 by means of a hand lever 45, slotted at its forward end, as shown at 46, to fit over the projecting end of the shaft 43, it being prevented from slipping off said shaft by means of a pin 47, or other suitable means. On the upper face of the gear 42 there is located a housing 48, in which slides a radial bolt 49, having an upwardly projecting finger 50. This finger is adapted to extend into an aperture 51 in the lever 45, which aperture is preferably the reduced rear end of the slot 46.

52 indicates a pin extending across the slot in the lever 45, and provided with an antifriction roller 53, said pin and roller defining the forward end of the aperture 51. The gear 42, which constitutes a steering member, is provided with a projection or lug 54, preferably an upward extension of the housing 48. The bolt 49 forms a locking bolt, being adapted to engage with a recess 55 in a collar 56, secured to the shaft 43 above the gear wheel 42. The bolt is caused to tend to engage this locking notch, and is held in engagement therewith when the parts are in locking position, by means of a spring 57, mounted in the lower part of the housing 48, and bearing against a downwardly extending tail piece 58 on the inner end of the bolt 49.

When the parts are in the position shown in full lines in Fig. 3, the gear 42 is locked to the shaft 43, so as to rotate therewith. By pulling rearwardly on the lever 45, the roller 53 will engage the finger 50, and withdraw the bolt 49 from engagement with the collar 56. The rear end of the lever 45 may be then depressed, so as to bring the roller 53 down between the lug or projection 54 and finger 50, in which position the locking bolt 49 is held in a disengaged position, and the gear 42 may be freely rotated in either direction on the shaft 43 by swinging the rear end of the lever 45 to one side or the other, as desired.

It will be understood, of course, that the lever 45 extends rearward to a point within convenient reach of the driver or operator, and by its means the guiding wheels may be so turned by the operator as to give the implement any desired direction.

The draft pole or tongue is indicated by the reference numeral 59, and is so connected to the shaft 43 as to impart rotary motion to said shaft when the tongue is swung laterally by the draft-animals or other means. For this purpose I prefer the construction shown, in which the shaft 43 extends below the bearing 44, and has secured thereon a collar 60. On the front of the collar 60 there is formed or secured a sleeve 61, arranged at right angles to the collar 60 and having a horizontal aperture 62 formed through it to receive the pivot bolt 63, by means of which the tongue is connected to the collar 60 in such a way as to permit it to play freely in a vertical direction. This connection is preferably effected by means of metallic straps or hounds 64, secured at their forward ends to the sides of the tongue, and adapted to receive the pivot bolt 63 at their rear ends.

It will be seen that when the controlling lever 45 is raised so as to permit the locking bolt 49 to lock the gear 42 to the shaft 43, any guiding movement imparted to the draft-animals will swing the tongue to one side or the other, and will correspondingly rotate the shaft 43 and gear 42, and, through the intermediate transmitting mechanism, will correspondingly turn the guiding wheels 35 into a position such as to give the implement the desired direction. By means of the lever 45, the gear wheel 42 may be disconnected from the shaft 43 in the manner already described, in which case the implement may be steered through the medium of the lever 45, without in any way interfering with the movement in a straight course of the means employed for drawing the vehicle. When the lever 45 is raised to a height sufficient to disengage it from the finger 50, said lever will not be affected by the rotary movement imparted to the gear 42 by the draft-animals. When said lever 45 is depressed sufficiently to hold the locking mechanism in inoperative position, the lug 54 fits within the slot of said lever, so that the locking bolt and its finger are relieved from lateral strains while the hand lever is being used as a steering means.

Obviously, my invention is capable of other embodiments than those shown, and the structural features may be varied as desired. For instance, while I have shown in Figs. 1, 2, 3 and 4 a spur gear transmitting mechanism which is adapted for a relatively narrow fore-truck, I prefer, where the fore-truck is of greater width, to employ the construction shown in Fig. 5, in which a sprocket gear 65 is substituted for the spur gear 42, similar sprocket gears 66 are substituted for the spur gears 40, and a sprocket chain 67 is employed as an intermediate transmitting mechanism. In any case, the gear 42, or its equivalent, constitutes a steering member which controls the position of the steering wheels, and with which either the draft pole or the steering lever may be connected, at will.

Various other modifications will readily suggest themselves to those skilled in the art, and I therefore do not wish to be understood as limiting myself strictly to the precise details of construction hereinbefore described and shown in the accompanying drawings.

Having thus fully described my invention, what I claim as new and desire to secure by Letters Patent is:—

1. The combination, with the implement to be drawn, of a truck supporting the forward end thereof and having a body fixed with relation to the implement, ground wheels having steering spindles pivotally connected with said truck, a steering member operatively connected with said spindles, means for manually operating said steering member, a draft pole connected to said truck so as to swing laterally with respect to the same, and means under the control of the operator for connecting the draft pole with and disconnecting it from said steering member, whereby, when said pole is so connected, its movements will control the position of the ground wheels, substantially as described.

2. The combination, with the implement to be drawn, of a truck supporting the forward end thereof and having a body fixed with relation to the implement, ground wheels having steering spindles pivotally connected with said truck, a shaft mounted to rotate in said body, a draft pole connected to said shaft so as to rotate the same when said pole swings laterally, a steering member loosely mounted on said shaft and operatively connected with the steering spindles of the ground wheels, means for connecting said steering member with said shaft so as to cause it to rotate in unison therewith, and for disconnecting it from said shaft so as to move independently thereof, and means for manually operating said steering member when disconnected from said shaft, substantially as described.

3. The combination, with the implement to be drawn, of a truck supporting the forward end thereof and having a body fixed with relation to the implement, ground wheels having vertical steering spindles pivotally mounted in said truck, a vertical shaft mounted in said truck, a draft pole connected to said shaft so as to rotate the same when said pole swings laterally, a steering member loosely mounted on said shaft and operatively connected with the steering spindles, and means under the control of the operator for connecting said steering member with and disconnecting it from said shaft and for manually operating it when so disconnected, substantially as described.

4. The combination, with the implement to be drawn, of a truck supporting the forward end thereof, ground wheels having vertical steering spindles pivotally mounted in said truck, a vertical steering shaft mounted in said truck, a draft pole connected to said shaft so as to rotate the same as the pole swings laterally, gearing connecting said spindles and shaft, comprising a gear loosely mounted on said shaft and provided with locking means whereby it may be connected with and disconnected from the shaft, and an operating lever adapted to be connected to said gear to rotate the same, said lever being longitudinally movable and controlling the locking mechanism through its longitudinal movement, substantially as described.

5. In a mechanism of the character described, the combination, with a steering shaft, and a steering member loosely mounted thereon, of a spring-actuated locking bolt mounted to move radially on the steering member and normally engaging the shaft, and a longitudinally movable slotted operating lever through which the shaft extends, said lever being adapted to engage the locking bolt to move the same longitudinally by its longitudinal movement, and to rotate the steering member by its lateral vibration when thus engaged, substantially as described.

6. In a mechanism of the character described, the combination, with a steering shaft, and a steering member loosely mounted thereon and provided with a projection, of a spring-actuated locking bolt mounted to slide radially on said steering member, normally engaging the shaft, and provided with a finger normally in contact with said projection and extending above the same, and an operating lever slotted to receive the shaft and finger and provided with a part adapted to engage the finger and to fit between the finger and projection when said lever is depressed, substantially as described.

7. In a mechanism of the character described, the combination, with a vertical steering shaft, ground wheels, and means for operatively connecting said steering shaft and the ground wheels, of a collar secured on said shaft, a horizontal sleeve carried by said collar, and a draft pole provided with a horizontal pivot passing through said sleeve, substantially as described.

8. The combination, with the implement to be drawn, of arms extending forward from the frame of said implement and provided with vertical bearing sleeves, a cross-bar connecting said arms, ground wheels having vertical steering spindles mounted in said sleeves, a vertical steering shaft mounted on said cross-bar, a laterally swinging draft pole operatively connected to said steering shaft, gears mounted upon the upper ends of the steering spindles, a gear loosely mounted on the upper end of the steering shaft and connected with the spindle gears by intermediate gearing, means for locking said central gear to the steering shaft, and an operating lever controlling said locking mechanism and central gear, substantially as described.

9. In a mechanism of the character described, a draft pole, a steering shaft operatively connected therewith, ground wheels, and a steering member loosely mounted on said shaft and operatively connected with the ground wheels, said steering member being provided with locking mechanism whereby it may be connected with and disconnected from the shaft, in combination with an operating lever adapted to vibrate both horizontally and vertically and to move longitudinally, the vertical movements of said lever connecting it with and disconnecting it from the steering member and locking mechanism, the longitudinal movements of said lever operating the locking mechanism, and the horizontal vibratory movements of said lever operating the steering member when disconnected from the shaft and engaged by said lever, substantially as described.

In testimony whereof I affix my signature in presence of two witnesses.

MOORE GOODFELLOW.

Witnesses:
 GEO. A. GROOT,
 ANNA F. SUTHERLAND.